United States Patent
Quaranta

(10) Patent No.: US 6,378,914 B1
(45) Date of Patent: Apr. 30, 2002

(54) HOSE END FITTING

(75) Inventor: Cosimo Quaranta, Turin (IT)

(73) Assignee: Properties Management, Ltd., Cleveland, OH (US)

( * ) Notice: Subject to any disclaimer, the term of this patent is extended or adjusted under 35 U.S.C. 154(b) by 11 days.

(21) Appl. No.: 09/638,105

(22) Filed: Aug. 11, 2000

(51) Int. Cl.[7] .............................................. B21D 39/00
(52) U.S. Cl. ......................... 285/256; 285/903; 29/520
(58) Field of Search ................................ 285/256, 903, 285/382; 29/520

(56) References Cited

U.S. PATENT DOCUMENTS

| | | | |
|---|---|---|---|
| 2,216,468 A | * 10/1940 | Farrar ..................... 285/256 X |
| 2,309,719 A | 2/1943 | Vaill |
| 2,323,912 A | 7/1943 | Johnson |
| 2,583,956 A | * 1/1952 | Lindsay et al. ......... 285/256 X |
| 2,848,254 A | 8/1958 | Millar |
| 3,023,496 A | 3/1962 | Millar |
| 3,673,547 A | 6/1972 | Ziegler, Jr. |
| 4,257,155 A | 3/1981 | Hunter |
| 4,400,022 A | 8/1983 | Wright |
| 4,437,691 A | 3/1984 | Laney |
| 4,542,922 A | 9/1985 | Grossauer |
| 4,630,850 A | 12/1986 | Saka |
| 4,671,542 A | 6/1987 | Juchnowski |
| 5,080,405 A | 1/1992 | Sasa et al. |
| 5,131,696 A | 7/1992 | Sykes et al. |
| 5,219,186 A | 6/1993 | Hosseinian et al. |
| 5,404,632 A | 4/1995 | Zaborszki |
| 5,499,439 A | 3/1996 | Zaborszki et al. |
| 5,511,720 A | 4/1996 | Zaborszki et al. |
| 6,092,274 A | * 7/2000 | Foti ............................ 29/520 |

FOREIGN PATENT DOCUMENTS

| | | | |
|---|---|---|---|
| EP | 545410 | * 3/1992 | ............. 285/903 X |
| GB | 2241547 | * 4/1991 | ............. 285/903 X |

* cited by examiner

Primary Examiner—Lynne H. Browne
Assistant Examiner—David E. Bochna
(74) Attorney, Agent, or Firm—Watts Hoffmann Fisher & Heinke

(57) ABSTRACT

A hose end fitting that comprises an annularly corrugated imperforate metal tube, a fitting member fixed to an end of the tube, and, first and second resiliently compressible sealing members. The metal tube has axially spaced apart outer corrugation peaks and axially spaced apart inner valleys, each valley interposed between two of the peaks. Adjacent peaks and valleys are connected together by radially extending tube walls. The fitting member comprises a fitting body defining a through opening, a seal seat surrounding and extending outwardly from the through opening, and a tube compressing extension projecting from the fitting body. The tube compressing extension resiliently compresses the tube so that the first sealing member is resiliently engaged between the seal seat and the tube end to prevent leakage from within the hose while the second sealing member is resiliently compressed between adjacent inwardly extending tube walls and sealingly engages at least one tube wall and a fitting wall to block fluid leakage from outside the hose into the space between the sealing members.

11 Claims, 2 Drawing Sheets

HOSE END FITTING

FIELD OF THE INVENTION

The present invention relates to fittings for hose ends and more particularly to end fittings for hoses that are constructed to transport reactive fluids through ambient reactive fluids where either fluid, or both, may react with and destroy seals in the hose fittings.

BACKGROUND OF THE INVENTION

It is often necessary to transport reactive fluent media through a gaseous or liquid medium that is also reactive. Sometimes the pressure differential between the media is substantial. Constructing hose end fittings where the juncture of the tube and fitting does not leak when subjected to high internal hose pressure has been a perennial problem. In the case of metal hoses, various different approaches have been taken. Some fittings have been hermetically welded or brazed onto the metal tubes. Where chemically reactive media are transported the materials used for the tube and fitting were special alloys that were difficult to weld or braze. Constructing these kinds of fittings required specialized equipment and skilled operators.

When hoses have been constructed from annularly corrugated tubes, fittings formed from members that are screwed together to crush interposed tube corrugations were sometimes employed. Usually the corrugations were crushed against a sealing face formed on one fitting member. Caulking material was sometimes applied where the crushed corrugations were seated to block leakage paths. In other hoses, rigid washer-like seating rings were associated with the sealing faces so that the corrugations were crushed against the seating ring.

Although these last mentioned fitting constructions were relatively easily assembled to corrugated tubes without requiring sophisticated tools or machinery, the hose performance was not optimal because leakage occurred after repeated usage. Hose flexures and repeated internal hose pressure cycling caused leakage paths to develop. Furthermore, in applications where the hoses directed reactive fluids through reactive atmospheres or liquids, sealant materials in the fittings were subject to being attacked by either reactive fluid, leading to leakage and fitting failures.

The present invention provides a new and improved metal hose and method of making the hose wherein the tube and end fitting are assembled without the need of specialized equipment or skilled labor, and the juncture of the end fitting and hose is resiliently sealed against leakage into or from within the hose by first and second seals that seal the hose while individually preventing the other seal from contacting potentially damaging reactive materials.

SUMMARY OF THE INVENTION

The present invention provides a hose end fitting that comprises an annularly corrugated imperforate metal tube, a fitting member fixed to an end of the tube, and, first and second resiliently compressible sealing members. The metal tube has axially spaced apart outer corrugation peaks and axially spaced apart inner valleys, each valley interposed between two of the peaks. Adjacent peaks and valleys are connected together by generally inwardly extending tube walls so that the tube defines an axially extending tube flow path through which fluent material may pass. The fitting member comprises a fitting body defining a through opening, a seal seat surrounding and extending outwardly from the through opening, and a tube compressing extension projecting from the fitting body. The tube compressing extension defines a tube corrugation positioner surface distal the fitting body and seal seat, and a tubular wall extending between the positioner surface and the fitting body. The first sealing member is shaped to sealingly engage the seal seat and is resiliently engaged with and between the seal seat and the tube end to prevent leakage of fluid from within the hose beyond the first sealing member. The second sealing member is spaced axially from the first sealing member and disposed between the first sealing member and the tube corrugation positioner surface. The second sealing member is resiliently compressed between adjacent inwardly extending tube walls and sealingly engages at least one of the adjacent tube walls and the tubular wall of the tube compressing extension. The second sealing member thus blocks fluid leakage from outside the hose into the space between the sealing members. The first and second sealing members are constructed from dissimilar materials.

In the illustrated embodiment the new fitting is fabricated by constructing a metal tube having a corrugated wall with successive corrugations defining inner and outer peaks joined by imperforate tube wall sections, terminating the tube adjacent a corrugation peak and fabricating a tube end fitting that comprises forming a fitting body having a through opening and a seal seat that surrounds the through opening with the seal seat extending outwardly relative to the through opening, and forming a tubular extension that projects from the fitting body and defines a tube corrugation positioner surface distal the fitting body. A first resiliently compressible sealing member is assembled to the fitting body in contact with the seal seat. A second resiliently compressible sealing member is assembled to the tube by placing the sealing ring between adjacent outer peaks that are located in the vicinity of the tube terminus. The fitting body is placed on the terminated tube end with the tube terminus engaging the first sealing member and the tube corrugation positioner located at least one outer corrugation peak from the second seal member. The extension is deformed to move the corrugation positioner surface into engagement with the tube just beyond the outer corrugation peak and axially compress the tube corrugations between the positioner surface and the seal seat. The second sealing member is resiliently compressed between the adjacent outer peaks and urged into sealing engagement with the tubular extension while the first sealing member is compressed between the tube terminus and the seal seat Additional features and advantages of the invention will become apparent from the following detailed description of an embodiment that is illustrated in the accompanying drawings which form part of the specification and in which:

DESCRIPTION OF THE BEST MODES CONTEMPLATED FOR PRACTICING THE INVENTION

Figure 1:
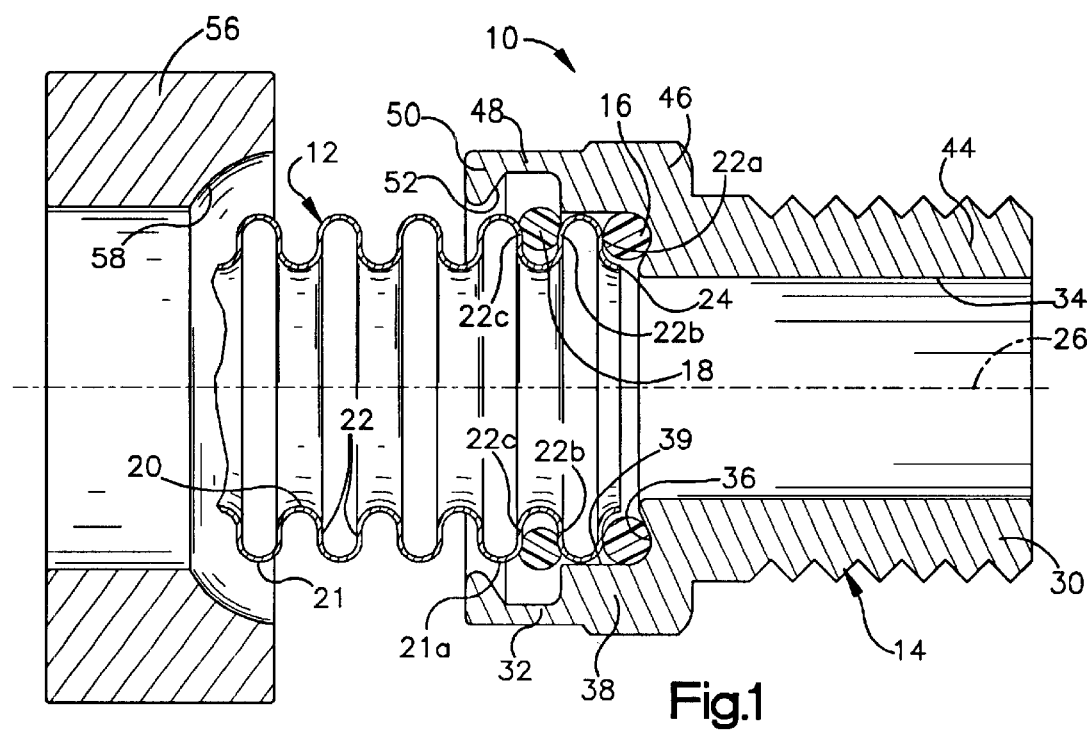
FIG. 1 is a fragmentary cross sectional view of a hose constructed according to the present invention at one stage during its fabrication.
Figure 2:
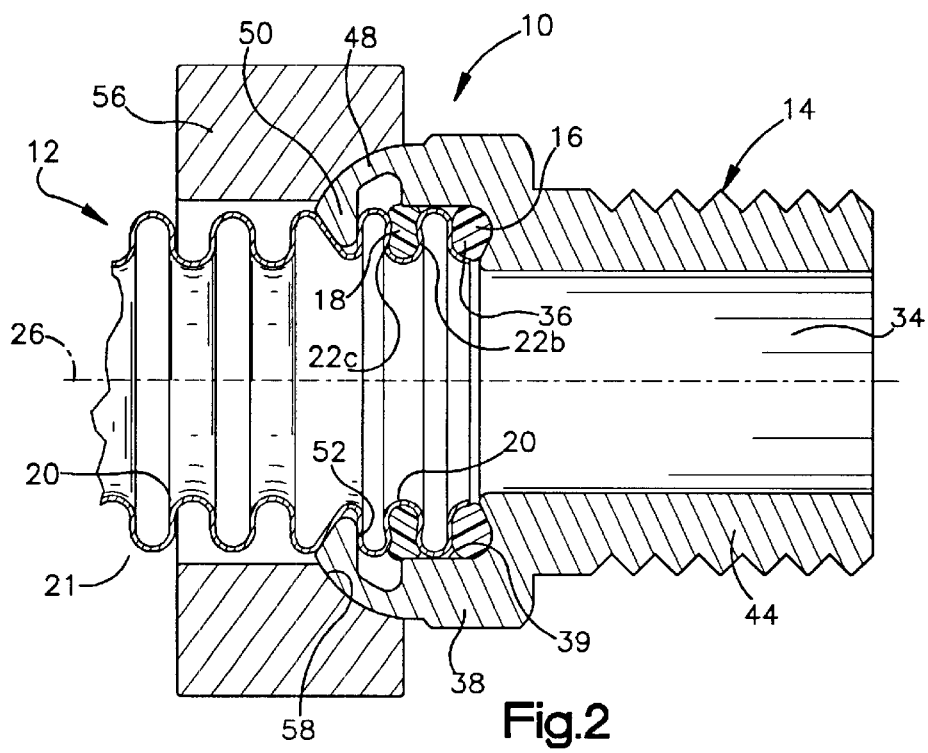
FIG. 2 is a fragmentary cross sectional view showing the hose of FIG. 1 at another stage of its fabrication.

A hose 10 constructed according to the invention is partially illustrated in FIGS. 1 and 2. The hose 10 is illustrated as a flexible metal hose intended for use in handling pressurized fluent materials. The hose 10 comprises a corrugated metal tube 12, a fitting 14 at the end of the tube and first and second sealing members 16, 18 for sealing the juncture of the fitting and tube against leakage either into the hose or out of the hose. More particularly, the illustrated hose 10 is adapted to direct flows of fluent reactive materials through atmospheres or liquids composed of chemically reactive materials. When hoses are used in such environments, hose fitting components may be chemically attacked by media inside the hose, outside the hose, or both. This is particularly true of sealing elements that are fabricated from resilient rubber-like materials.

The tube 12 is an annularly corrugated imperforate metal tube having axially spaced apart inner corrugation valleys 20 and axially spaced apart outer corrugation peaks 21. Each valley 20 is interposed between two of the peaks, with adjacent peaks and valleys connected together by generally inwardly extending tube wall sections 22 so that the tube 12 defines an axially extending tube flow path through which fluent material may pass. The tube 12 is terminated by cutting it along a wall section 22 near a corrugation peak or valley. In the illustrated hose 10 the tube is terminated adjacent a valley 20 so that the terminal wall section, indicated by the reference character 22a, extends inwardly and axially to its edge 24. The illustrated tube 12 is annularly corrugated—meaning that each corrugation extends about the tube in a plane that is normal to the tube axis 26 and parallel to the adjacent corrugations. In the illustrated embodiment, the tube is circular in cross section, but other cross sectional shapes are possible. The tube 12 may be formed from any suitable metal, for example stainless steel, and in any well known manner, such as by "hydro forming" a continuous tube or by hermetically bonding a series of prefabricated corrugations together.

The fitting 14 forms the end of the hose 10 and is attached to the tube 12. The fitting 14 is so constructed and arranged that it may be connected to a hose coupling, a nozzle, a pipe or any other fluid handling device for delivering fluid to, or from, the hose. The fitting 14 comprises a fitting body 30 at the end of the tube 12 and a tube compressing extension 32 that projects from the fitting body in the direction of the tube axis 26. The fitting body 30 defines a through opening 34, a seal seat 36 that surrounds the through opening and confronts the tube end 24, and a collar-like fitting body projection 38 extending axially from the seal seat 36 to the tube compressing extension 32 beyond the sealing members 16, 18. The illustrated fitting body projection 38 is a tubular, relatively thick wall with its inner wall surface 39 extending closely about the tube 12 and sealingly engaging the sealing members 16, 18.

The through opening 34 is generally aligned with the tube axis 26. The seal seat 36 defines a sealing surface that extends radially outwardly relative to the through opening and conforms to the cross sectional shape of the tube. Thus, in the illustrated fitting 14, the sealing surface of the seat 36 has a circular peripheral shape that conforms to the cross sectional shape of the tube 12.

For purposes of illustration in FIGS. 1 and 2, the fitting body 30 is shown as having an externally threaded nipple section 44 projecting away from the tube 12, and a radially outwardly projecting section 46 that defines external wrench flats that facilitate screwing the nipple section to a receiving member.

The sealing member 16 is disposed between the fitting 14 and the tube 12 and is urged against the seat 36 by the tube 12 when the fitting and tube are assembled. The illustrated sealing member is a continuous resilient member that surrounds the through opening 34. The sealing member periphery is shaped to conform to the seat 36 and the tube 12 cross sectional shape. Thus, in the illustrated hose the sealing member is a toroidal O-ring formed from a stiffly resilient rubber-like plastic material. The illustrated seal seat 36 is slightly concave so that it conforms to the toroidal surface sealing member 16.

The illustrated sealing member 16 is urged into sealing engagement with both the seat 36 and the body projection inner wall 39. The tube 12 is severed adjacent a valley 20 so that the terminal tube wall section 22a extends axially toward the seal seat and radially inwardly. The resultant force applied to the sealing ring by the wall section 22a urges the sealing ring axially into engagement with the seat 36 and radially outwardly into engagement with the surface 39.

The tube wall section 22a sealingly engages the sealing member 16. The confronting surfaces of the wall section 22a and the sealing member are smooth and make contact over a relatively wide area. The resilient force applied by the tube assures that the juncture of the engaged surfaces blocks leakage of fluid from within the hose between the tube end and the sealing member.

The second sealing member 18 is axially spaced from the first sealing member 16 and disposed between the first sealing member and the tube compressing extension 32. The second sealing member is resiliently compressed between adjacent inwardly extending tube wall sections 22b, 22c. The second sealing member 18 sealingly engages at least one of the adjacent inwardly extending tube walls 22b, 22c and the body projection inner wall surface 39 to block fluid leaking from outside the hose into the space between said sealing members 16, 18 where it might contact the sealing member 16. The sealing member 18 illustrated by FIGS. 1 and 2 is a continuous resilient member that surrounds and is shaped to conform to the tube 12 cross sectional shape. Thus, in the illustrated hose the sealing member is a toroidal O-ring formed from a stiffly resilient rubber-like plastic material that is chosen so that it is not subject to chemical attack by fluid ambient the hose. In the hose illustrated in FIGS. 1 and 2 the sealing member 18 is sealingly and resiliently engaged with both wall sections 22b and 22c and the body projection inner wall surface 39.

The tube compressing extension 32 is deformed to fix the fitting 14 to the tube 12. The extension 32 comprises a deformable wall section 48 between the fitting body wall 38 and a tube corrugation positioner 50 distal the fitting body 30. The extension 32 is deformed to shift the corrugation positioner 50 toward engagement with the tube 12 just beyond a corrugation peak. The corrugation positioner 50 resiliently compresses at least two tube corrugations and both sealing members between the corrugation positioner and the seal seat 36. In the embodiment illustrated by FIGS. 1 and 2 the positioner 50 is initially stationed radially outwardly from the outer peaks so the fitting 14 can be installed on the tube end without interference. The positioner shifts radially inwardly toward engagement with the adjacent outer tube peak 21a and, as the shifting movement continues, cams the peak 21a toward the seal seat 36. Both the section of the tube 12 between the positioner 50 and the seal seat 36, and the sealing members 16, 18 themselves are resiliently compressed as the positioner moves.

In the hose illustrated by FIGS. 1 and 2, the extension 32 is yieldably, or inelastically, deformed so that the fitting 14 is permanently fixed to the tube. The fitting, sealing members, sealing members and tube are assembled to the condition illustrated by FIG. 1 after which the extension is deformed to secure the fitting and tube together. In the illustrated embodiment a swaging tool 56 defining a female die cavity 58 is disposed about the tube 12. The fitting and die are forced together for example by the use of a suitable press so that the extension 32 is forced into the die and inelastically deformed into a radially inwardly convergent shape as exemplified by FIG. 2. The extension deformation takes place all along the extension from a location adjacent the juncture of the extension 32 and the fitting body wall 38. The body wall 38 is constructed so that its configuration remains unchanged by the swaging operation. In the illustrated fitting the body wall 38 is radially thicker than the extension wall section.

The illustrated extension wall section 48 is formed by a tubular, substantially continuous wall disposed about the tube and that projects from the fitting body tubular wall 38 about the tube 12. The illustrated extension wall section 48 is cylindrical. The illustrated positioner 50 extends radially inwardly toward the tube 12 and defines a smooth camming, or wedging, surface 52 that is generally frustoconical and faces axially toward the seal seat and radially inwardly before the extension 32 is deformed (FIG. 1). After the fitting and tube are secured together the surface 52 extends generally radially (see FIG. 2). The camming surface 52 applies a compressive force to the tube. The illustrated positioner is formed by a thickened flange-like lip that extends continuously about the extension wall section end distal the fitting body.

Figure 3:
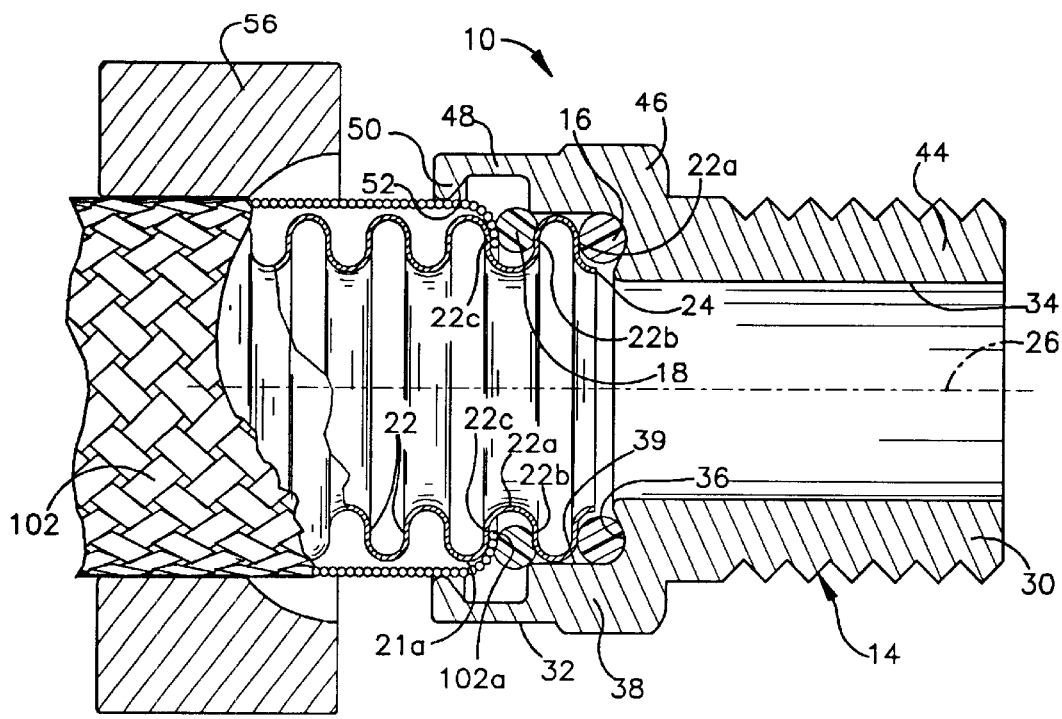
FIG. 3 is a fragmentary cross sectional view of a modified hose constructed according to the invention at one stage of its fabrication; and, FIG. 4 is a fragmentary cross sectional view showing the hose of FIG. 3 at another stage of its fabrication.
Figure 4:
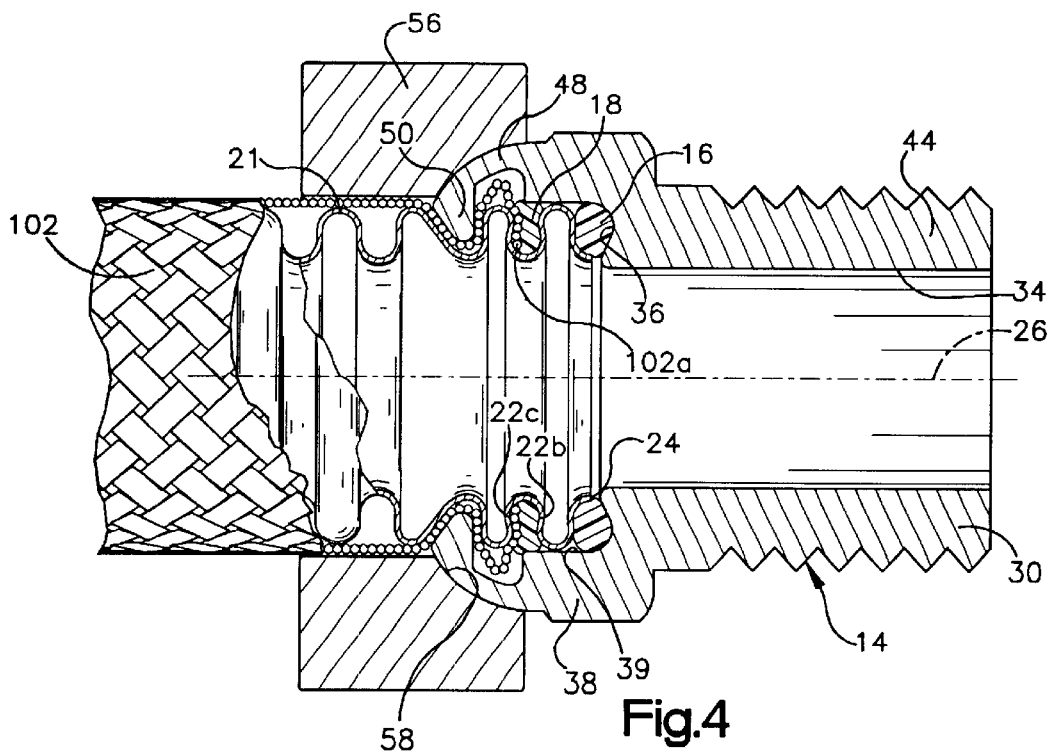

FIGS. 3 and 4 illustrate a modification of the hose featured by FIGS. 1 and 2 in which a reinforcing shroud 102 is fitted about the tube 12. The hose of FIGS. 3 and 4 is otherwise the same as the hose of FIGS. 1 and 2 and the various parts of the hose of FIGS. 3 and 4 that are the same as parts of FIGS. 1 and 2 are indicated by identical reference characters.

The reinforcing shroud 102 surrounds and reinforces the tube 12 against forces resulting from internal pressure levels that far exceed the pressure ambient the hose. Opposite ends of the shroud are disposed near the ends of the tube. The shroud end 102a is disposed within the hose end fitting 14. As illustrated, the end of the shroud extends along a corrugation face 22c and terminates adjacent a radially inner valley 20a. The shroud may be of any suitable or conventional construction—the illustrated shroud 102 is formed from braided fine metal wires and therefore is not described in detail.

The fitting 14 not only seals the juncture of the fitting and the tube 12 but also secures the shroud 102 in place. In such a hose, the fitting extension 32 is constructed to extend along the exterior of both the tube 12 and the shroud 102. The extension 32 is swaged and yieldably deformed radially inwardly from a location near the body projection 38 so that the corrugation positioner 50 shifts toward the adjacent corrugation peak as the swaging occurs. The positioner applies axial compressing force against the tube corrugation through the shroud 102, effectively locking the shroud in place between the positioner and the corrugation peak. As the corrugations are compressed, the sealing member 16 is resiliently urged into engagement with the sealing seat 36 while the sealing member 18 is resiliently compressed between the shroud end 102a and the corrugation section 22b and wedged into engagement with the surrounding inner wall surface 39. Resilient engagement between the section 22b and the sealing member 18 seals the path between the sealing member and the tube, while resilient engagement between the sealing member and the shroud end aids in securing the shroud end in place.

While two embodiments of the invention have been illustrated and described in considerable detail, the invention is not to be considered limited to the precise constructions disclosed. Various adaptations, modifications, and uses of the invention may occur to those skilled in the business to which the invention relates. For example, the fittings can be constructed using various different schemes for coupling the fitting to other hoses, valves, and so forth. Different kinds of sealing rings can be used that exhibit different chemical properties and have differing degrees of resiliency, depending on the usage of the hose. The intention is to cover all such adaptations, modifications, and uses coming within the spirit or scope of the appended claims.

What is claimed is:

1. A hose end fitting comprising:

a) an annularly corrugated :imperforate metal tube having axially spaced apart outer corrugation peaks and axially spaced apart inner valleys, each valley interposed between two of said peaks, adjacent peaks and valleys connected together by generally inwardly extending tube walls so that said tube defines an axially extending tube flow path through which fluent material may pass;

b) a fitting member fixed to an end of said tube, said fitting member comprising a fitting body, and a tube compressing extension projecting from the fitting body, said fitting body defining a through opening aligned with the said tube flow path, a seal seat aligned with the tube walls, surrounding the through opening and extending outwardly from the through opening, and a tubular wall between said tube compressing extension and said seal seat, said tube compressing extension comprising a tube corrugation positioner surface distal the fitting body;

c) said extension deformed to shift said corrugation positioner surface toward engagement with the tube just beyond a corrugation peak and axially toward said fitting body, said corrugation positioner surface resiliently compressing the corrugations between said corrugation positioner surface and said seal seat;

d) a first resiliently compressible sealing member shaped to sealingly engage said seal seat, said seal member resiliently engaged with and between said seal seat and said tube end to prevent leakage of fluid from within the hose beyond said first sealing member; and, e) a second resiliently compressible sealing member axially spaced from said first sealing member and disposed between said first sealing member and said tube corrugation positioner surface, said second sealing member resiliently compressed between adjacent inwardly extending tube walls, said second sealing member sealingly engaging at least one of said adjacent inwardly extending tube walls and said tubular wall to block fluid leaking from outside the hose into the space between said sealing members f) said sealing members formed from dissimilar materials.

2. The fitting claimed in claim 1 wherein said sealing members are O-rings and the tube cross sectional shape is circular.

3. The fitting claimed in claim 1 wherein said tube compressing extension comprises a wall section between said tubular wall and said positioner surface, said tubular wall defining a sealing surface surrounding and engaged by said second sealing member, said extension wall section yeildably deformed and shifted relative to said tubular wall.

4. The fitting claimed in claim 3 wherein said tubular wall is imperforate.

5. The fitting claimed in claim 3 wherein said extension wall section is imperforate.

6. The fitting claimed in claim 1 wherein said extension wall section extends to said positioner surface and has a wall thickness that is less than the wall thickness of said tubular wall.

7. The fitting claimed in claim 1 further comprising a braided wire sheath surrounding said tube and extending into the space between said positioner surface and said second sealing member, said sheath terminating along one of said inwardly extending walls, said second sealing member engaging said sheath and anchoring said sheath in said fitting.

8. The fitting claimed in claim 1 wherein said second sealing member resiliently engages both of said adjacent inwardly extending tube walls.

9. A method of fabricating a hose end comprising:
   a. constructing a metal tube having a corrugated wall with successive corrugations defining inner and outer peaks joined by imperforate tube wall sections;
   b. terminating the tube adjacent a corrugation peak;
   c. fabricating a tube end fitting comprising;
      i. forming a fitting body having a through opening, a seal seat that surrounds the through opening with the seal seat extending outwardly relative to the through opening, and a tubular wall extending from the seal seat;
      ii. forming a tubular extension that projects from the fitting body and defines a tube corrugation positioner surface distal the fitting body;
   d. selecting first and second resiliently compressible sealing members, which are composed of first and second dissimilar materials, for assembly with said fitting body and said tube;
   e. assembling said first resiliently compressible sealing member to the fitting body in contact with the seal seat;
   f. assembling said second resiliently compressible sealing member to said tube comprising placing said sealing member between adjacent outer peaks that are located in the vicinity of the tube terminus;
   g. placing the fitting body on the terminated tube end with the tube terminus engaging the first sealing member and the tube corrugation positioner located at least one outer corrugation peak from the second sealing member; and,
   h. deforming the extension
      i. to move the corrugation positioner surface into engagement with the tube just beyond said at least one outer corrugation peak and axially compress the tube corrugations between the positioner surface and the seal seat; and,
      ii. resiliently compress the second sealing member between said adjacent outer peaks and urge said second sealing member into sealing engagement with the tubular wall while compressing said first sealing member between the tube terminus and the seal seat.

10. The method claimed in claim 9 wherein deforming the extension comprises inelastically deforming the extension so that the fitting body is fixed to the tube.

11. The method claimed in claim 9 further comprising placing a shroud on said tube that has an end adjacent the tube termination and wherein deforming the extension comprises moving the positioner into engagement with said shroud while compressing the tube corrugations and clamping the shroud to the tube to anchor the shroud on the tube.

* * * * *

UNITED STATES PATENT AND TRADEMARK OFFICE
CERTIFICATE OF CORRECTION

PATENT NO. : 6,378,914 B1
DATED : April 30, 2002
INVENTOR(S) : Cosimo Quaranta

It is certified that error appears in the above-identified patent and that said Letters Patent is hereby corrected as shown below:

Title page,
Item [73], Assignee, "Properties Management, Ltd." should read -- 40 Properties Management, Ltd. --.

Signed and Sealed this

Tenth Day of September, 2002

Attest:

JAMES E. ROGAN
*Attesting Officer*      *Director of the United States Patent and Trademark Office*